(12) United States Patent
Ellis et al.

(10) Patent No.: US 6,732,367 B1
(45) Date of Patent: May 4, 2004

(54) INTERACTIVE TELEVISION PROGRAM GUIDE SYSTEM WITH TITLE AND DESCRIPTION BLOCKING

(75) Inventors: Michael D. Ellis, Boulder, CO (US); Donald W. Allison, Tulsa, OK (US); Connie T. Marshall, Muskogee, OK (US); Thomas R. Lemmons, Sand Springs, OK (US)

(73) Assignee: United VIdeo Properties, Inc., Hollywood, CA (US)

( * ) Notice: Subject to any disclaimer, the term of this patent is extended or adjusted under 35 U.S.C. 154(b) by 0 days.

(21) Appl. No.: 09/201,105

(22) Filed: Nov. 30, 1998

(51) Int. Cl.[7] .............................. H04N 7/25; H04N 7/10; H04N 5/445
(52) U.S. Cl. .............................. 725/27; 725/28; 725/30; 725/39
(58) Field of Search .............................. 725/58, 25, 27, 725/28, 30, 39, 44; H04N 7/25, 7/10, 5/445

(56) References Cited

U.S. PATENT DOCUMENTS

| | | | |
|---|---|---|---|
| 4,520,404 A | 5/1985 | Von Kohorn |
| 4,554,584 A | 11/1985 | Elam et al. |
| 4,605,964 A | 8/1986 | Chard |
| 4,620,229 A | 10/1986 | Amano et al. |
| 4,685,131 A | 8/1987 | Horne |
| 4,706,121 A | 11/1987 | Young |
| 4,718,107 A | 1/1988 | Hayes |
| 4,750,213 A | 6/1988 | Novak |
| 4,888,796 A | 12/1989 | Olivo, Jr. |
| 4,930,158 A | 5/1990 | Vogel |
| 4,930,160 A | 5/1990 | Vogel |
| 4,977,455 A | 12/1990 | Young |
| 5,151,789 A | 9/1992 | Young |
| 5,172,111 A | 12/1992 | Olivo, Jr. |
| 5,253,066 A | 10/1993 | Vogel |
| 5,353,121 A | 10/1994 | Young et al. |
| 5,371,795 A | 12/1994 | Vogel |
| 5,387,942 A | 2/1995 | Lemelson |
| 5,434,678 A | 7/1995 | Abecassis |
| 5,446,488 A | 8/1995 | Vogel |
| 5,479,266 A | 12/1995 | Young et al. |
| 5,488,409 A | 1/1996 | Yuen et al. |
| 5,523,794 A | 6/1996 | Mankovitz et al. |

(List continued on next page.)

FOREIGN PATENT DOCUMENTS

| | | |
|---|---|---|
| WO | WO 91/00670 | 1/1991 |
| WO | WO 93/04473 | 3/1993 |
| WO | WO 95/32584 | 11/1995 |
| WO | WO 96/09721 | 3/1996 |
| WO | WO 96/13932 | 5/1996 |

(List continued on next page.)

Primary Examiner—Andrew Faile
Assistant Examiner—Andrew Y Koenig
(74) Attorney, Agent, or Firm—Fish & Neave; Alexander Shvarts

(57) ABSTRACT

A system is provided in which an interactive television program guide is implemented on user television equipment. Potentially objectionable material such as the titles and descriptions of adult programs may be blocked. When adult program listing blocking is invoked, the program guide replaces adult program listings with unobjectionable material such as a blank region, a generic unobjectionable program listing, or an unobjectionable title based on the channel being blocked. The user may invoke blocking of titles, descriptions, or both titles or descriptions. Blocking may be based on the rating of the program listings. Access may be provided to blocked program listings by entering a parental control code. The user may temporarily disable adult program listing blocking. The user may also set parental control locks for any type of potentially objectionable programming and may temporarily disable such locks.

39 Claims, 18 Drawing Sheets

U.S. PATENT DOCUMENTS

| | | | |
|---|---|---|---|
| 5,541,738 A | | 7/1996 | Mankovitz |
| 5,550,575 A | * | 8/1996 | West et al. ............... 725/28 |
| 5,552,837 A | | 9/1996 | Mankovitz |
| 5,583,576 A | * | 12/1996 | Perlman et al. ............ 725/28 |
| 5,589,892 A | | 12/1996 | Knee et al. |
| 5,619,274 A | | 4/1997 | Roop et al. |
| 5,621,579 A | | 4/1997 | Yuen |
| 5,629,733 A | * | 5/1997 | Youman et al. ............ 725/53 |
| 5,652,613 A | | 7/1997 | Lazarus et al. |
| 5,701,383 A | | 12/1997 | Russo et al. |
| 5,781,246 A | | 7/1998 | Alten et al. ............... 725/40 |
| 5,805,763 A | * | 9/1998 | Lawler et al. ............ 386/83 |
| 5,828,402 A | | 10/1998 | Collings |
| 5,832,212 A | * | 11/1998 | Cragun et al. ............ 713/202 |
| 5,969,748 A | * | 10/1999 | Casement et al. ............ 725/27 |

FOREIGN PATENT DOCUMENTS

| | | |
|---|---|---|
| WO | WO 96/25821 | 8/1996 |
| WO | WO 96/27982 | 9/1996 |
| WO | WO 96/36172 | 11/1996 |
| WO | WO 96/41472 | 12/1996 |
| WO | WO 97/13368 | 4/1997 |
| WO | WO 97/31479 | 8/1997 |
| WO | WO 97/32434 | 9/1997 |
| WO | WO 97/34413 | 9/1997 |
| WO | WO 97/34414 | 9/1997 |
| WO | WO 97/49245 | 12/1997 |
| WO | WO 98/16056 | 4/1998 |
| WO | WO 98917064 | 4/1998 |
| WO | WO 99/04561 | 1/1999 |

* cited by examiner

WITHOUT BLOCKING 150

| | 7:00 | 7:30 | 8:00 |
|---|---|---|---|
| REQ 1 | TERMINATOR | | |
| SPICE | XXX-1 | XXX-2 | |
| REQ 2 | VOLCANO | | |

154

WITH BLOCKING 152

| | 7:00 | 7:30 | 8:00 |
|---|---|---|---|
| REQ 1 | TERMINATOR | | |
| SPICE | SPICE IN THE EVENING | | |
| REQ 2 | VOLCANO | | |

```
┌─────────────────────────────┐
│ PROVIDE OPPORTUNITY FOR USER│
│ TO INVOKE BLOCKING OF ADULT │──178
│ PROGRAM LISTINGS            │
└─────────────────────────────┘
              │ USER INVOKES BLOCKING
              ▼
┌─────────────────────────────────┐
│ BLOCK USER ACCESS TO FUNCTIONS  │
│ SUCH AS SETTING REMINDERS FOR   │
│ BLOCKED PROGRAM LISTINGS,       │
│ RECORDING OF PROGRAMS           │──180
│ FOR BLOCKED PROGRAM LISTINGS,   │
│ AND INCLUDING A BLOCKED PROGRAM │
│ LISTING IN A FAVORITE PROGRAM   │
│ PROFILE                         │
└─────────────────────────────────┘
```

*FIG. 15*

```
                                            182
                                           ⎞
   ┌─────────────────────────────────┐
   │ PROVIDE OPPORTUNITY FOR USER    │
   │ TO TEMPORARILY DISABLE BLOCKING │
   │ OF ADULT PROGRAM LISTINGS       │
   └─────────────────────────────────┘
                   │ USER SELECTS
                   ↓ TEMPORARY DISABLING
   ┌─────────────────────────────────────┐
   │ TEMPORARILY UNBLOCK PROGRAM LISTINGS│
   │ FOR ADULT PROGRAMMING WITH PROGRAM  │
   │ GUIDE (E.G., UNTIL NO USE OF ADULT  │
   │ PROGRAM LISTINGS FOR AN EVENING OR  │
   │ UNTIL USER TURNS OFF USER TELEVISION│
   │ EQUIPMENT)                          │
   └─────────────────────────────────────┘
                                       ⎞
                                       184
```

*FIG. 16*

INTERACTIVE TELEVISION PROGRAM GUIDE SYSTEM WITH TITLE AND DESCRIPTION BLOCKING

BACKGROUND OF THE INVENTION

This invention relates to television program guide systems. More particularly, this invention relates to interactive television program guides in which adult program listings information such as the titles and descriptions of adult television programs may be blocked, so that such information is not displayed to the user.

Cable, satellite, and broadcast television systems provide viewers with a large selection of television channels. Viewers have traditionally consulted printed television program guides to plan their viewing. More recently, interactive television program guides have been developed to display program listings on a user's television.

Interactive program guides are typically implemented on set-top boxes. Such program guides allow users to view television program listings in different display formats. For example, a user may instruct the program guide to display a grid of program listings organized in a channel-ordered or a time-ordered list. Users may also search and sort program listing by theme (e.g., movies, sports, etc.) or by title (i.e., alphabetically). A user may view additional information on a program by placing a highlight region on a desired program listing and pressing an "info" button. The user may purchase a pay program from the program guide by placing the highlight region on a program listing and pressing, for example, an "OK" button. The user may record a program by placing the highlight region on a program listing and pressing a "record" button.

In order to prevent children from viewing potentially objectionable programs, interactive television program guides typically have parental control options. For example, some program guides allow parents to place a parental control lock on certain channels. The parental control lock may only be opened by entering a parental control code. Children without access to the parental control code are not able to view programming on the locked channels. One problem with this type of system is that it may be inconvenient for parents to turn on and off all the parental control locks every time they wish to view locked programming.

Moreover, although these program guides are effective at preventing children from viewing potentially objectionable programming, there is nothing that prevents children from viewing program titles or program descriptions that the parents feel are offensive.

It is therefore an object of the present invention to provide an interactive television program guide system that allows potentially objectionable program listings such as adult program titles and program descriptions to be blocked.

It is also an object of the present invention to provide an interactive television program guide system in which a user may set parental control locks for certain television programming and may temporarily disable such locks.

SUMMARY OF THE INVENTION

These and other objects of the invention are accomplished in accordance with the principles of the present invention by providing an interactive television program guide system in which an interactive television program guide implemented on user television equipment provides users with an opportunity to block adult program listings or other potentially objectionable material (e.g., material that might be considered by some users to be too graphic or violent). When the user invokes blocking, the program guide replaces potentially objectionable material with unobjectionable material such as a blank region, a generic title or description, or a title or description related to the channel of the blocked program listing.

The system has a main facility from which program listings are distributed to multiple television distribution facilities (i.e., cable system headends, satellite distribution facilities, or broadcast facilities). Each television distribution facility distributes the program listings to multiple users each of which has user television equipment such as a set-top box and television.

Program listings that contain potentially objectionable material may be identified at the television distribution facilities or may be identified at the main facility prior to distribution of the program listings to the television distribution facilities. Identification of potentially objectionable material may be based on ratings, keywords, channel information, or other suitable criteria. For example, the program listings for all X-rated programs may be identified as being potentially objectionable.

The program guide may provide the user with various opportunities to invoke blocking. For example, the user may be provided with options in a set-up menu for turning blocking off or on. If desired, the user may be provided with options that allow the user to control the level of blocking (e.g., based on ratings or other suitable criteria). The user may block titles, program descriptions, or both titles and descriptions.

The operator of a television distribution facility may be provided with an opportunity to block the display of potentially objectionable material with the interactive television program guide. If the operator of the television distribution facility does not invoke blocking, complete program listings may be distributed to the user television equipment associated with that television distribution facility. If the operator invokes blocking, program listings in which potentially objectionable material has been blocked may be distributed or a blocking command may be transmitted to the user television equipment associated with the facility. If desired, blocking may be invoked for all users of the program guide.

The program guide may provide access to blocked information when the user enters a parental control code. For example, the program guide may unblock previously blocked adult program descriptions.

The program guide may provide an adult programming screen that contains primarily adult program listings. If the user invokes blocking, the program guide may prevent users from accessing the adult programming screen until a parental control code is entered. If desired, the program guide may allow users to temporarily disable blocking.

The system also allows the user to set parental control locks for any type of potentially objectionable programming. The program guide allows the user to temporarily disable parental control locks when a user wishes to view locked television programming. When temporary disablement is finished, the locks that were originally set may be completely restored.

Further features of the invention, its nature and various advantages will be more apparent from the accompanying drawings and the following detailed description of the preferred embodiments.

BRIEF DESCRIPTION OF THE DRAWINGS

FIG. 11 is a diagram of two illustrative interactive television program guide screens in accordance with the present invention. The upper screen is a program guide screen displayed when program listings blocking has not been invoked. The lower screen is a program guide screen displayed when program listings blocking has been invoked.

FIG. 15 is a flow chart of steps involved in blocking user access to certain program guide functions in connection with adult programs when adult program listings blocking is invoked in accordance with the present invention.

FIG. 16 is a flow chart of steps involved in temporarily disabling adult program listings blocking in accordance with the present invention.

DETAILED DESCRIPTION OF THE
PREFERRED EMBODIMENTS

Figure 1:
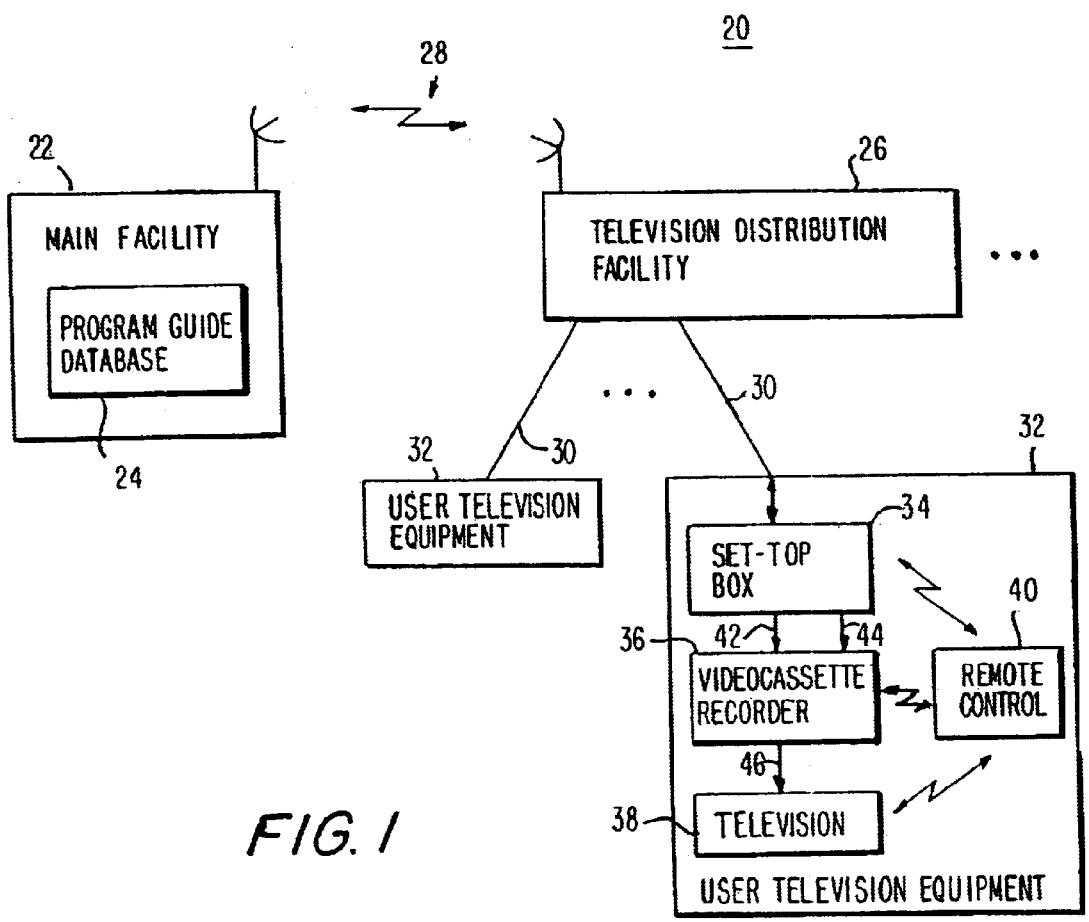
FIG. 1 is a schematic diagram of an illustrative program guide system in accordance with the present invention.

An illustrative program guide system 20 in accordance with the present invention is shown in FIG. 1. Main facility 22 provides television program data from program guide database 24 to multiple television distribution facilities 26 via communications links such as communications link 28. Only one television distribution facility 26 is shown in FIG. 1 to avoid over-complicating the drawings. Each link 28 may be a satellite link, a telephone network link, a cable or fiber optic link, a microwave link, a combination such links, or any other suitable communications path. If it is desired to transmit video signals over link 28 in addition to data signals, a relatively high bandwidth link such as a satellite link may generally be preferred to a relatively low bandwidth link such as a telephone line. Television distribution facility 26 may be a cable system headend, a broadcast distribution facility, or a satellite television distribution facility. Television distribution facility 26 is operated by a cable system operator, a satellite television system operator, or a broadcast television system operator.

The program data transmitted by main facility 22 to television distribution facility 26 includes television program listings data such as program times, channels, titles, descriptions, ratings, etc. Transmitted program data also includes pay program data such as pricing information for individual programs, subscription channels, and packages, time windows for ordering programs, channels and packages, telephone numbers for placing orders that cannot be impulse ordered, etc. If desired, some of this data may be provided using data sources at facilities other than main facility 22. For example, data related to pay program order processing (e.g., billing data and the like) may be generated by an order processing and billing system that is separate from television distribution facility 26.

In interactive television program guide systems, television distribution facility 26 distributes the program data to the user television equipment 32 of multiple users via communications paths 30. Program data may be distributed to user television equipment 32 using any suitable scheme. For example, program guide data may be provided in a continuous stream or may be transmitted at a suitable time interval (e.g., once per hour). If program data is transmitted continuously, it may not be necessary to store the data locally at user television equipment 32. Rather, user television equipment 32 may extract data "on the fly" as it is needed. If desired, television distribution facility 26 may poll user equipment 32 periodically for certain information (e.g., pay program account information or information regarding programs that have been purchased and viewed using locally-generated authorization techniques).

User television equipment 32 typically contains equipment such as set-top box 34, an optional videocassette recorder 36, and television 38. Set-top box 34, videocassette recorder 36, and television 38 may be controlled by remote control 40 or other user input interface such as a wireless keyboard, mouse, trackball, dedicated set of buttons, etc.

Set-top box 34 contains a microprocessor and other circuitry for executing instructions to support an interactive television program guide. The program guide may be implemented on set-top box 34 or may be implemented on user television equipment other than a set-top box, such as an advanced television receiver, personal computer television (PC/TV), or other equipment into which circuitry similar to set-top box circuitry has been integrated. For clarity, the present invention will be illustrated in connection with a set-top box implementation. Moreover, for clarity the present invention will be illustrated in connection with a system arrangement in which data is distributed from a main facility to a program guide on user television equipment via a television distribution facility. Other suitable systems involve systems in which data is distributed to a program guide on user television equipment using other suitable distribution schemes, such as schemes involving data transmission over the Internet or the like. If desired, the program guide may be implemented using a client-server architecture in which the primary processing power for the program guide is provided by a server located at, for example, the television distribution facility or the main facility and user television equipment (e.g., a PC/TV, etc.) acts as a client processor.

In the arrangement shown in FIG. 1, communications paths 30 preferably have sufficient bandwidth to allow television distribution facility 26 to distribute scheduled television programming, pay programming, promotional videos, and other video information to user television equipment 32 in addition to program data. If desired, program data may be distributed by one or more distribution facilities that are similar to but separate from television distribution facility 26 using communications paths that are separate from communications paths 30.

Certain functions such as pay program purchasing may require user television equipment 32 to transmit data to distribution facility 26 over communications paths 30. If desired, such data may be transmitted over telephone lines or other separate communications paths (not shown). If functions such as these are provided using facilities separate from television distribution facility 26, some of the communications with user television equipment 32 may be made directly with the separate facilities.

Multiple television and audio channels (analog, digital, or both analog and digital) may be provided to set-top box 34 via communications path 30. The television channels may include normal television channels, pay programming channels, and channels used to transmit promotional videos. During normal television viewing, the user tunes set-top box 34 to a desired one of these channels. The signal for that television channel may be provided at video output 42 as a radio-frequency (RF) signal on a predefined channel (e.g., channel 3 or 4), as a demodulated video signal, or as a digital video signal such as an MPEG-2 signal. The video signal at output 42 is received by optional videocassette recorder 36, so that the user may record programs. Program recording and other features may be controlled by set-top box 34 using control path 44. Control path 44 may be any suitable control path such as a control path that uses an infrared transmitter for transmitting infrared signals to videocassette recorder 36.

Television 38 may receive RF or demodulated video signals or a digital video signal from videocassette recorder 36 via path 46. The video signals on path 46 may either be generated by videocassette recorder 36 when playing back a prerecorded videocassette or may by passed through from set-top box 34. If videocassette recorder 36 is not used in the system, path 46 may be connected directly to path 42 so that signals may be passed directly from set-top box 34 to television 38. The video signals provided to television 38 may contain real-time video signals for broadcast television programs, pay programs, or promotional videos. For example, if set-top box 34 is tuned to a particular channel, the video signals for that channel may be provided to television 38. Set-top box 34 also displays various program guide displays on television 38, which typically contain television program listings information (e.g., titles, channels, program descriptions, ratings, etc.).

Remote control 40 may have cursor keys, an "enter," "select," or "OK" button, a "guide" button, a "record" button, an "info" button, and various other control buttons. When the user presses the "guide" button, set-top box 34 invokes the interactive program guide and may display an appropriate screen of program listings on television 38.

A typical program guide display is a grid or other suitable table or list of television program listings. In a typical program guide display, rows of listings may be associated with different television channels and columns may be associated with different scheduled broadcast times for the programs (e.g., 9:00 PM, 9:30 PM, and 10:00 PM).

Grids or tables of program listings and other program guide services may be accessed using any suitable technique. For example, set-top box 34 may provide various menus from which the user may select certain program guide options. On certain program guide screens a highlight region may be used to define the current position of the user. The user may position the highlight region using the cursors on remote control 40 (FIG. 1) and may make selections by pressing the "OK" button or a similar button as needed for a desired action.

The program listings displayed by the program guide occasionally contain potentially objectionable material (i.e., material that some users to not wish to view or do not wish to have their children view because of its graphic, violent, or sexual content). For example, program listings for adult programs may contain language that some parents do not wish to have their children view. The program guide allows users to block potentially offensive program listings such as adult program listings, so that this material is not displayed by the program guide. Although the program guide may block any type of potentially objectionable material, for purposes of illustration the blocking feature of the present invention will be described in connection with the blocking of adult program listings.

Figure 2:
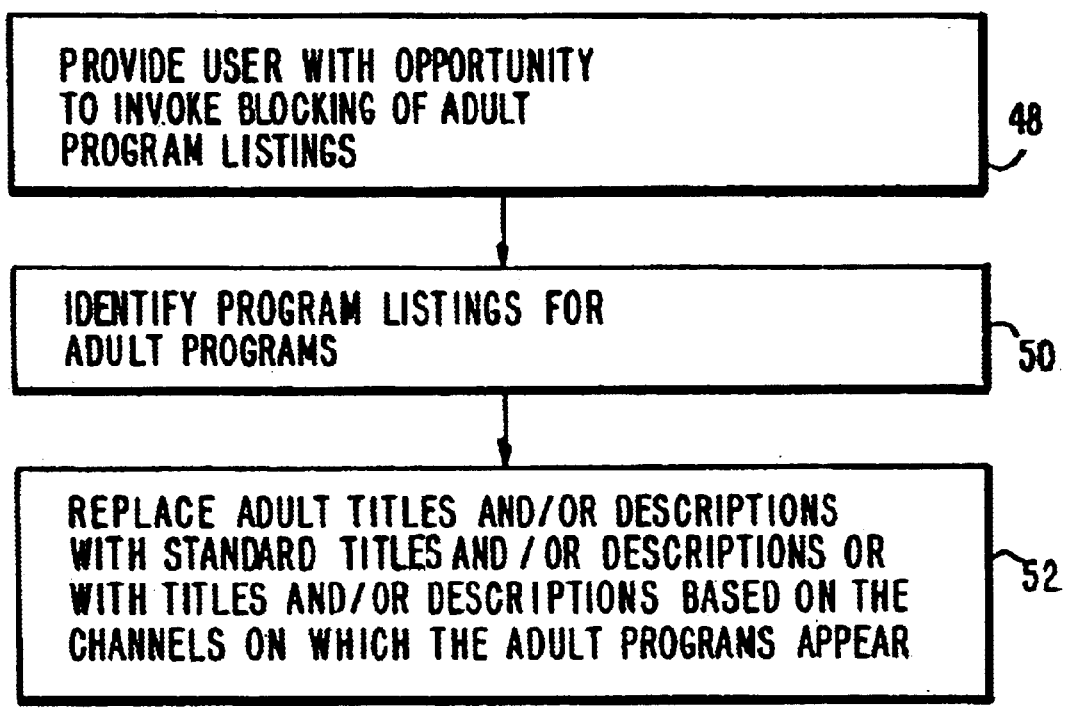
FIG. 2 is a flow chart of steps involved in blocking potentially objectionable program listings in accordance with the present invention.

Steps involved in blocking adult program listings are shown in FIG. 2. At step 48, the program guide provides the user with an opportunity to invoke adult program listing blocking. At step 50, the program listings that relate to adult programming are identified. At step 52, some or all of the adult titles and/or adult program descriptions in the adult program listings that were identified at step 52 are replaced with inoffensive material by the program guide.

Figure 3:
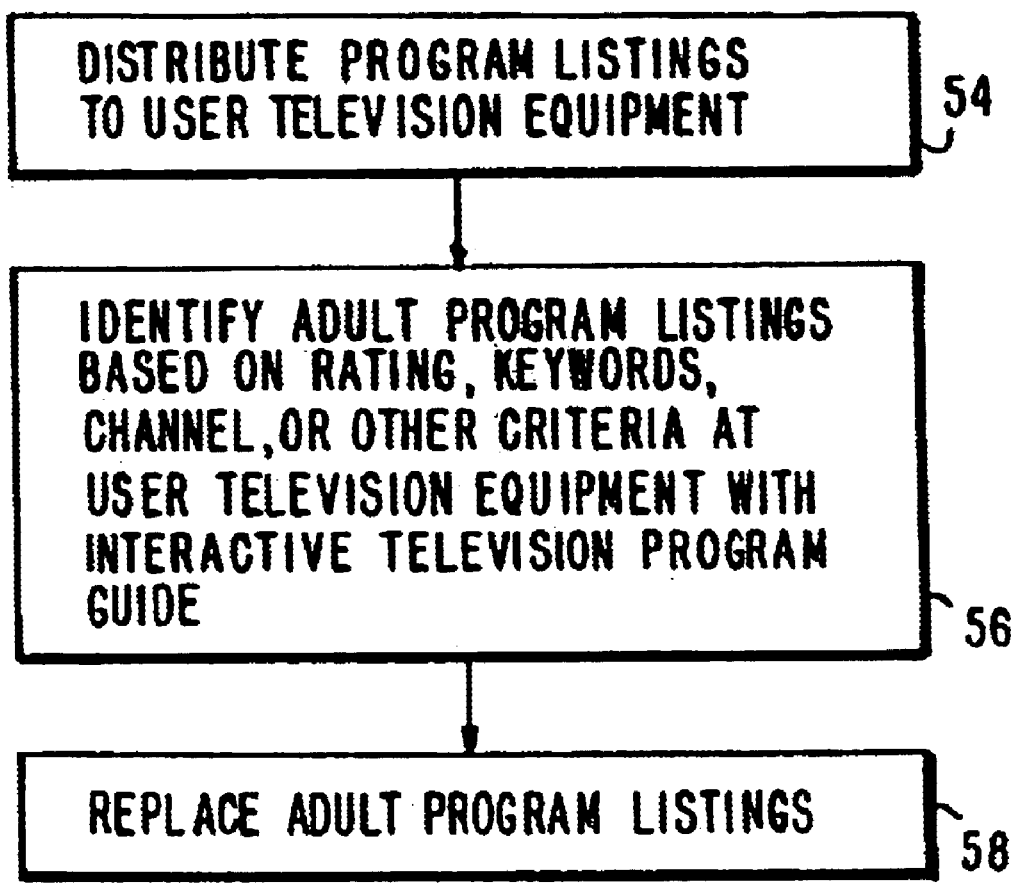
FIG. 3 is a flow chart of steps involved in identifying and blocking potentially objectionable program listings at user television equipment in accordance with the present invention.

If desired, the program listings that are related to adult programming may be identified by the program guide after the program listings data has been distributed to user television equipment 32. This is shown in FIG. 3. At step 54, the program listings are distributed to user television equipment 32. At step 56, the program guide at user television equipment 32 identifies which of the program listings contain adult material based on ratings data in the program listings, keyword matches with the text of the program listings, or other suitable criteria. If desired, the program guide may identify which program listings are adult program listings at step 56 based on program listings information on the channel with which the program listings are associated (e.g., the Playboy channel). At step 58, the adult program listings identified at step 56 are replaced with inoffensive material by the program guide.

Figure 4:
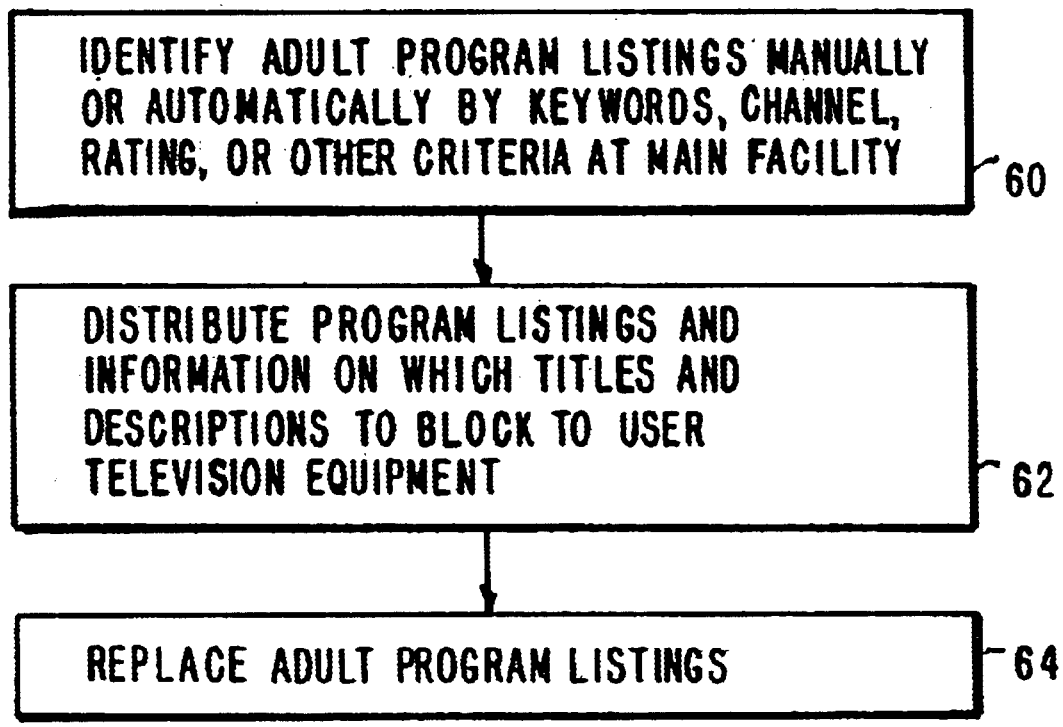
FIG. 4 is a flow chart of steps involved in blocking potentially objectionable program listings by identifying potentially objectionable program listings at a main facility prior to distributing the program listings to a television distribution facility in accordance with the present invention.

As shown in FIG. 4, the program listings that are related to adult programming may also be identified prior to transmitting the program listings from main facility 22. With the approach shown in FIG. 4, adult program listings are identified at main facility 22 at step 60. The task of identifying adult program listings at step 60 may be performed manually or may be performed automatically by a computer at main facility 22 based on keywords, channel information, ratings information, or other suitable criteria. At step 62, the program listings and information on which program listings are adult program listings that may be blocked are distributed to user television equipment 32 via television distribution facilities 26. At step 64, the program guide replaces the adult program listings that were identified at step 60 with inoffensive material.

Figure 5:
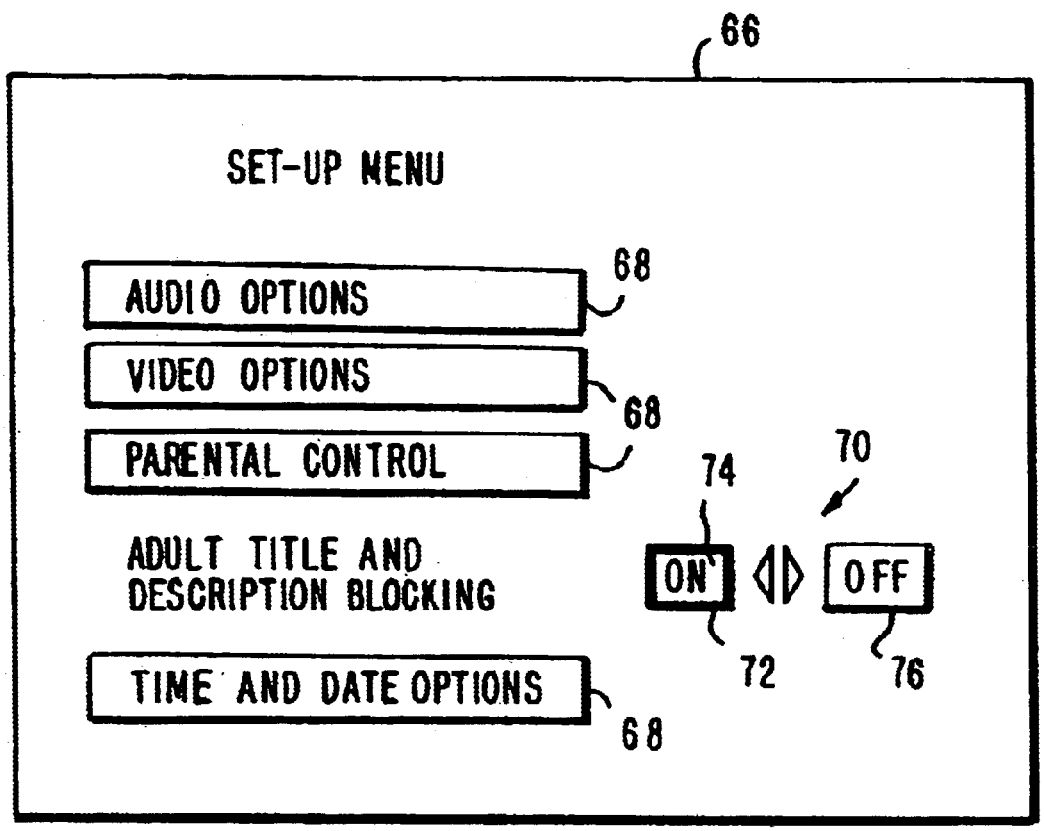
FIG. 5 is an illustrative program guide set-up menu in accordance with the present invention.

The program guide provides the user with an opportunity to invoke the blocking of adult program listings. For example, the program guide may provide a set-up menu such as set-up menu 66 of FIG. 5. Set-up menu 66 contains options 68 for setting various program guide features and contains adult program listings blocking option 70 for turning on or off adult program listings blocking. The user may make menu selections by positioning a highlight region such as highlight region 72 on top of a desired option using remote control cursor keys and by pressing an OK or select remote control button. To invoke adult program listings blocking the user may press the OK button after placing highlight region 72 on top of "on" button 74. To view program listings without any blocking the user may press the OK button after placing highlight region 72 on top of "off" button 76.

Figure 6:
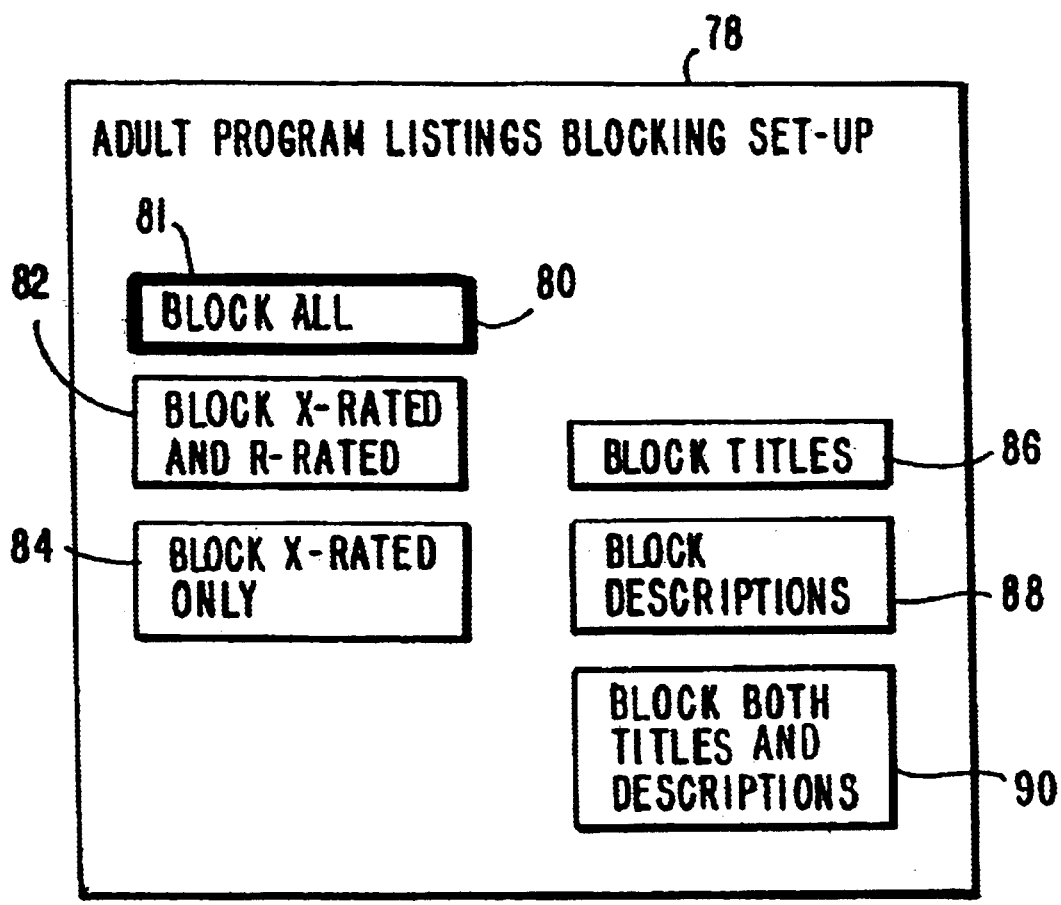
FIG. 6 is an illustrative adult program listings blocking set-up program guide screen in accordance with the present invention.

If desired, the program guide may provide different degrees of adult program listings blocking. For example, an adult program listings blocking set-up screen 78 may be provided as shown in FIG. 6. If the user selects block all option 80 (e.g., with highlight region 81), the program guide will block all adult program listings (i.e., all program listings that match the keyword, channel, rating, and other criteria that are used to identify adult program listings). If the user selects partial blocking option 82, the program guide will only block X-rated and R-rated program listings. Program listings that contain potentially objectionable material, but that do not have an R or X rating will not be blocked. If the user selects partial blocking option 84, the program guide will only block program listings with an X rating. (R and X ratings are merely illustrative.)

If the user desires to block only adult titles, the user may select block titles option 86. Selecting option 86 directs the program guide to block adult titles in the program listings, but to allow adult program descriptions in the program listings to be displayed (e.g., if the user presses an info button on remote control 40). If the user desires to block only adult program descriptions, the user may select block descriptions option 88. Selecting option 88 directs the program guide to block adult program descriptions, but allows the program guide to display adult titles on various program guide screens. If the user desires to block both adult titles and descriptions, the user may select option 90. Selecting option 90 directs the program guide to block the display of both adult titles and adult program descriptions in the program guide. The partial blocking options shown in FIG. 6 are illustrative only. Any suitable scheme may be used to allow the user to block more or less than the all of the identified adult program listings if desired.

Figure 7:
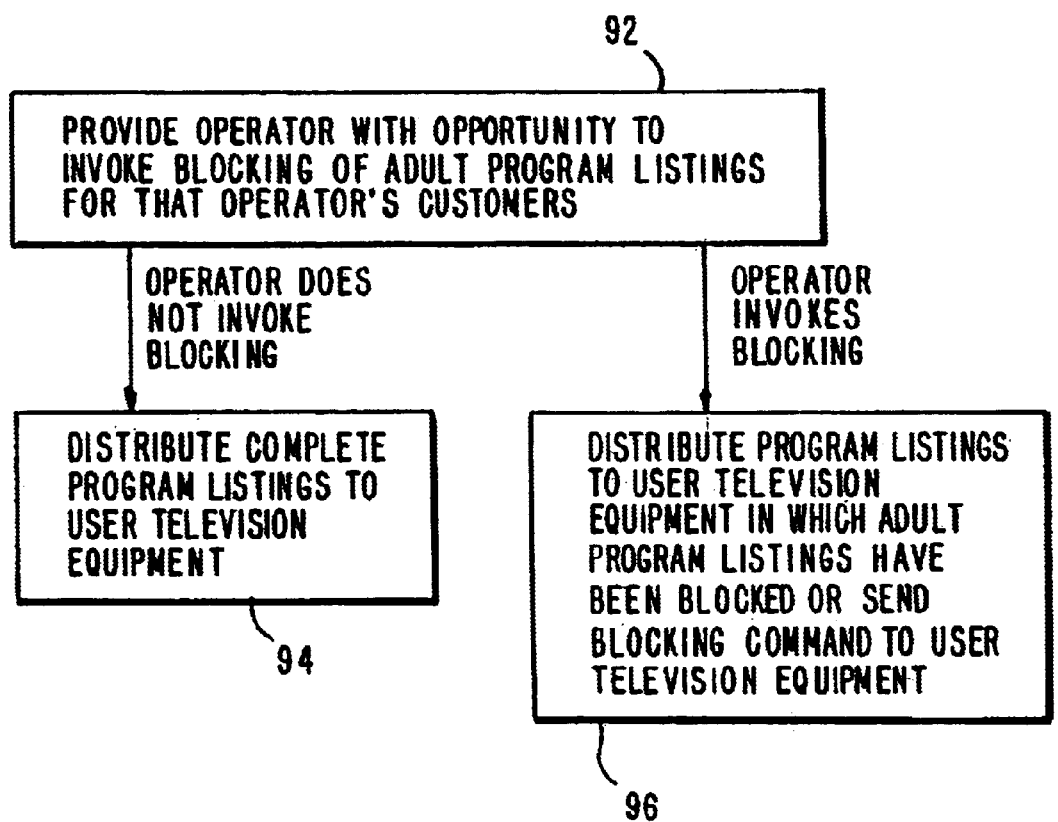
FIG. 7 is a flow chart of steps involved in allowing an operator at a television distribution facility to block the display of potentially objectionable program listings in accordance with the present invention.

The program guide may be used to block adult program listings for all viewers in a single community. This may be accomplished, for example, by allowing the operators of television distribution facilities 26 to send blocking commands to user television equipment 32. If desired, such operator-originated blocking commands may be distributed to the appropriate user television equipment 32 by sending the commands to main facility 22 for redistribution as blocking commands specifically addressed to the user television equipment 32 associated with the originating television distribution facility. When the program guide receives a blocking command, the program guide invokes adult program listing blocking. Alternatively, the program guide may be provided with program listings in which the adult titles and descriptions have already been blocked. This type of arrangement may be used by the operator of a television distribution facility 26 to block adult titles and descriptions for all of the operators's customers or may be used to block adult titles and descriptions for all users of the program guide. Steps involved in allowing an operator to invoke blocking are shown in FIG. 7. At step 92, the operator of television distribution facility 26 is provided with an opportunity to block adult program listings for that operator's customers. For example, a control application that runs on a computer that is located in television distribution facility 26 may be used to provide the operator with an opportunity to invoke blocking. If the operator does not invoke blocking, complete program listings are distributed to the user television equipment 32 associated with the television distribution facility 26 for that operator at step 94. If the operator invokes blocking, at step 96 the television distribution facility 26 for the operator is used to distribute program listings to the users for which adult program listings have been blocked or the television distribution facility 26 is used to send or redistributed a suitable blocking control signal to the user television equipment associated with that television distribution facility. If desired, control signals suitable for invoking blocking may be transmitted to user television equipment 32 from main facility 22 so that blocking may be invoked for all program guide users.

Figure 8:
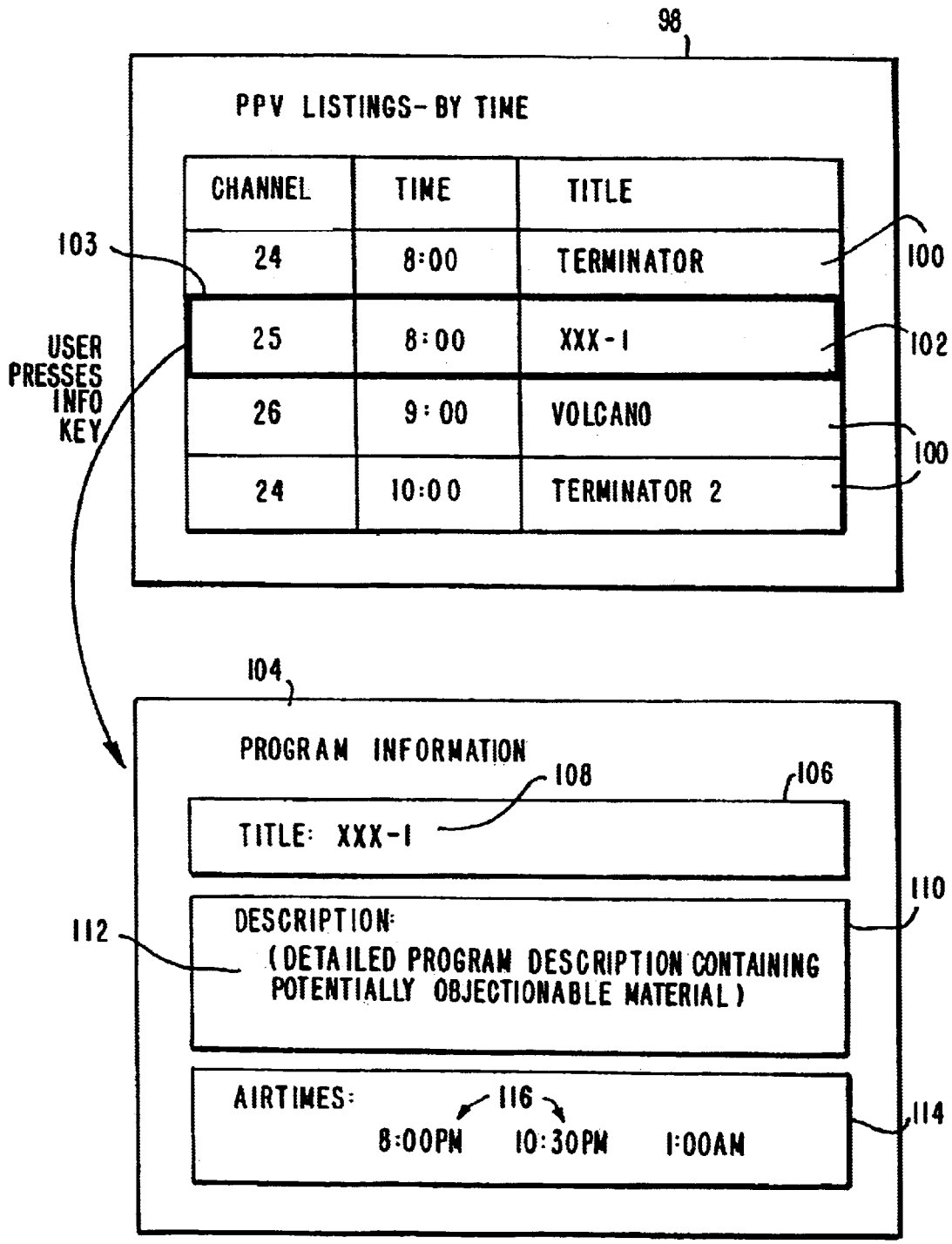
FIG. 8 is a diagram of two illustrative interactive television program guide screens in accordance with the present invention when program listings blocking has not been invoked. The upper screen is a pay-per-view program listings screen. The lower screen is a program information screen.

An illustrative interactive television program guide screen that may be provided by the program guide when adult program listings blocking is turned off is shown as the upper screen in FIG. 8. Screen 98 contains pay-per-view program listings organized by time. Some program listings, such as program listings 100, do not contain any objectionable material. Program listing 102, however, contains potentially objectionable language in its title (depicted as "XXX-1" in FIG. 8). The user may position a highlight region such as highlight region 103 on top of a desired program listing. When the user presses an information key or other suitable remote control button, the program guide may present an information screen such as illustrative information screen 104, which contains information on the selected program. Information screen 104 has a title region 106 containing adult title 108, detailed description region 110 containing a detailed description 112 of the selected program, and airtimes region 114 containing airtimes 116 when the selected program is scheduled to be broadcast. In information screen 104, title 108 and detailed description 112 may contain objectionable material if not blocked.

When the user invokes adult program listing blocking, the program guide blocks the display of adult program listings information on the various program guide screens presented by the guide. For example, objectionable title 102 of FIG. 8 may be replaced with a generic unobjectionable title such as "adult programming," as shown in program listing 118 of program guide screen 120 of FIG. 9. If the user requests additional program listings information for program listing 118, the program guide may display information screen 122. On screen 122, title 108 of screen 104 has been replaced with a generic title 126. Detailed program description 112 and airtimes 116 of FIG. 8 have been completely blocked by the program guide, so that description region 128 and airtimes region 130 of screen 122 are empty.

Figure 9:
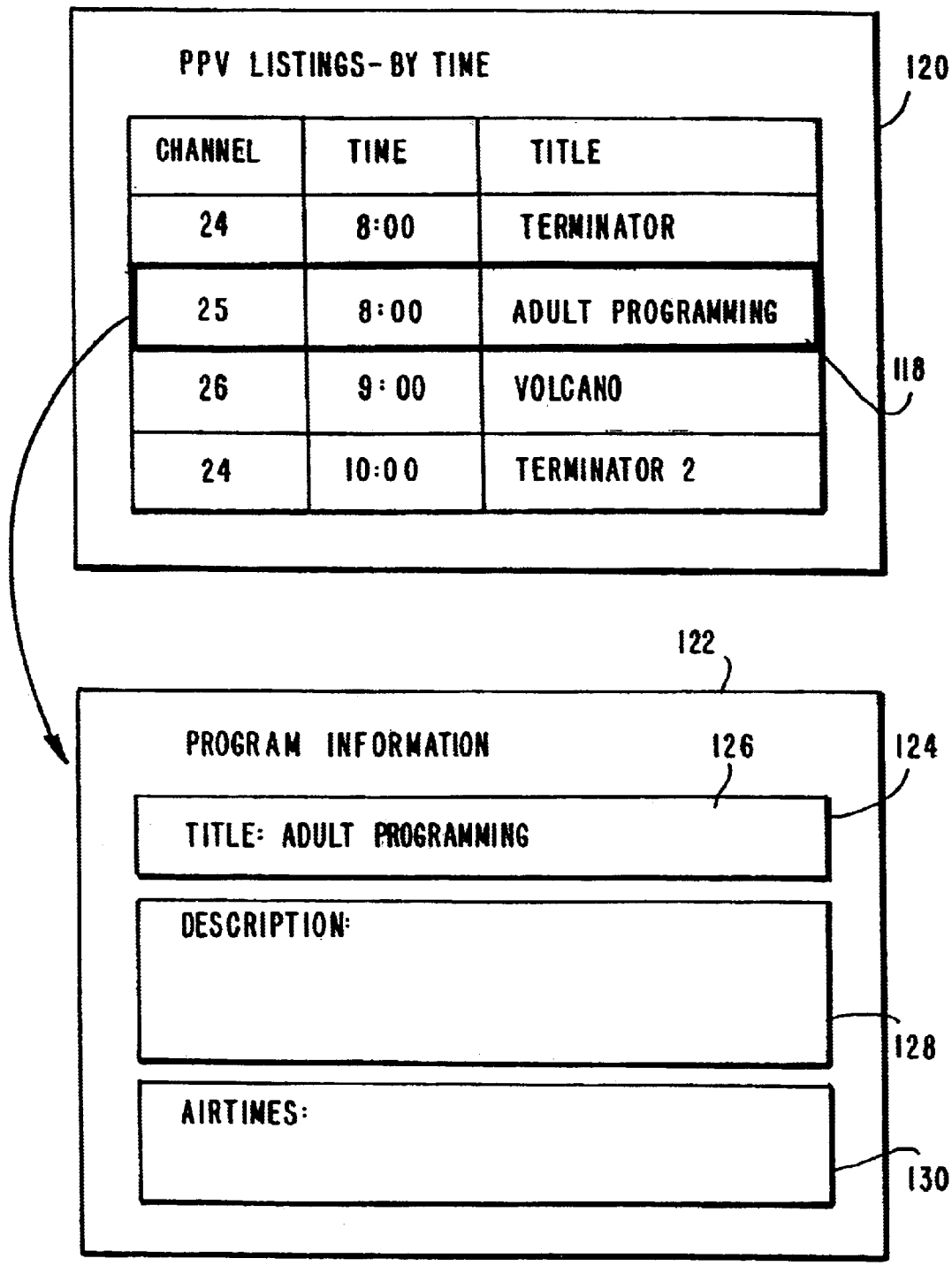
FIG. 9 is a diagram of two illustrative interactive television program guide screens in accordance with the present invention when program listings blocking has been invoked. The upper screen is a pay-per-view program listings screen in which an adult program title has been replaced with an unobjectionable title. The lower screen is a program information screen in which an adult program title has been replaced with an unobjectionable title and an adult program description has been replaced by an empty region.

The arrangement shown in FIG. 9 is illustrative only. Various other arrangements may be used. For example, description region 128 could be provided with a generic description such as adult programming, etc. Moreover, the program listings information that is blocked by the program guide depends on which blocking option the user selects. For example, if the user selects block descriptions option 88 of FIG. 6, only the description in description region 128 is blocked; the regular title appears in program listing 118 and title region 124. Airtimes region 130 need not be blocked, even if there is blocking, e.g., in description region 128.

Figure 10:
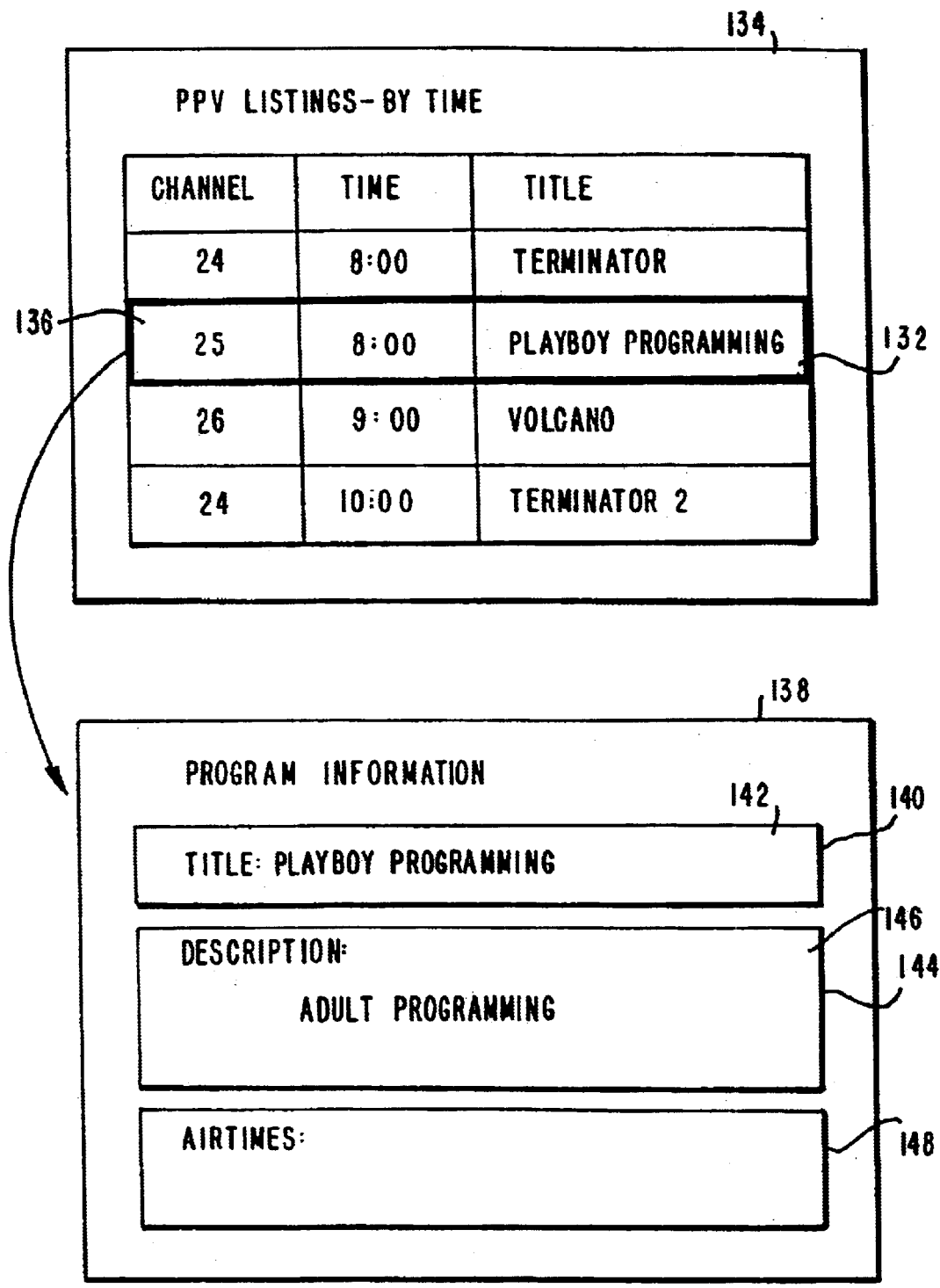
FIG. 10 is a diagram of two illustrative interactive television program guide screens in accordance with the present invention when program listings blocking has been invoked. The upper screen is a pay-per-view program listings screen in which an adult program title has been replaced with a title that is descriptive of the channel for the blocked title. The lower screen is a program information screen in which an adult program title has been replaced with a title that is descriptive of the channel of the title and an adult program description has been replaced by an unobjectionable program description.

If blocking is performed based on which channel the adult program listing is associated with, then information on the blocked channel may be presented in place of the objectionable title. For example, if adult program listings blocking is on and the program guide identifies the Playboy Channel as a channel for which program listings should be blocked, the program guide may replace the regular (potentially objectionable) title for the Playboy Channel program listing with the title "Playboy Programming," as shown in program listing 132 of screen 134 in FIG. 10. If the user selects program listing 132 with highlight region 136, the program guide presents information screen 138, in which the regular title in title region 140 has been replaced by an unobjectionable channel-descriptive title 142. The regular detailed description in description region 144 has also been replaced with the generic unobjectionable description 146. Airtimes in airtimes region 148 may be replaced with a blank region or may be displayed in their normal fashion.

If blocking is based on a particular channel and that channel contains packages of programming (e.g., adult time blocks of programs that may typically be purchased only as a complete package), the program guide may replace blocked titles in the package with a suitable package title. This is illustrated in FIG. 11. In the program guide screen 150 displayed by the program guide when adult program listings blocking has not been invoked, the adult channel Spice has two scheduled adult programs (depicted as "XXX-1" and "XXX2" in FIG. 11). When adult program listings blocking is invoked, the program guide replaces screen 150 with screen 152. In screen 152, the regular (potentially objectionable) program titles of the Spice channel program listing 154 have been replaced by the single unobjectionable package title "Spice in the Evening" in program listing 156.

Figure 12:
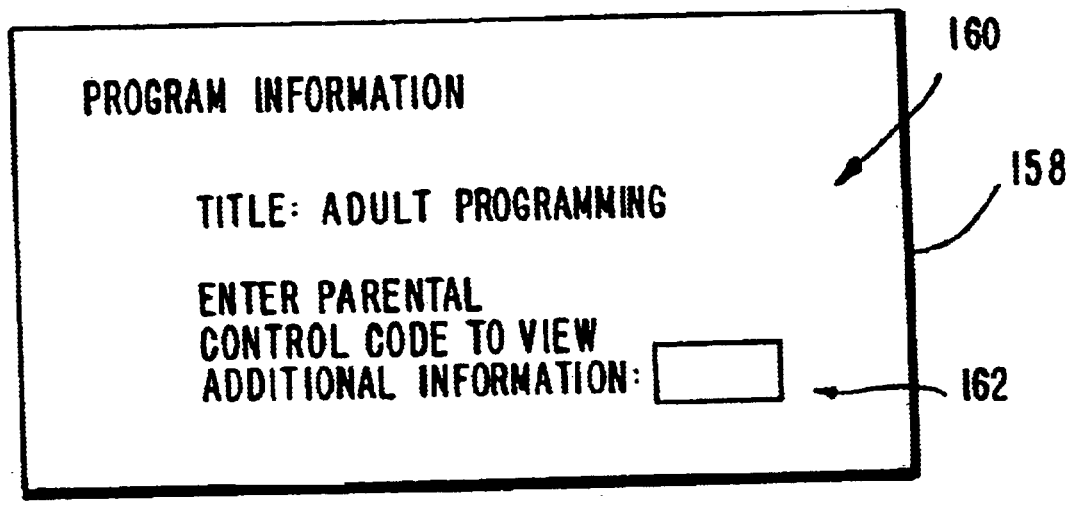
FIG. 12 is an illustrative program information screen in which the user is provided with an opportunity to enter a parental control code to access blocked adult program description information in accordance with the present invention.

If desired, the program guide may allow the user to view program description information after entering a suitable parental control code. With a program guide that provides this feature, the program guide may present a modified program information screen such as modified program information screen 158 of FIG. 12 whenever a user requests more information on a given program listing (e.g., by highlighting that listing and pressing an information remote control button). In modified program information screen 158 of FIG. 12, the original (potentially objectionable) title has been replaced with a generic unobjectionable title 160. However, the rest of the information normally presented in a program information screen is not shown. Instead, parental control entry prompt 162 is provided, so that the user may enter a predefined parental control code. This may be, for example, the same parental control code that is otherwise used for controlling access to the viewing of locked programs. The arrangement shown in FIG. 12 is merely illustrative. Any other suitable scheme for controlling access of the user to adult program description information may be used by the program guide if desired.

Figure 13:
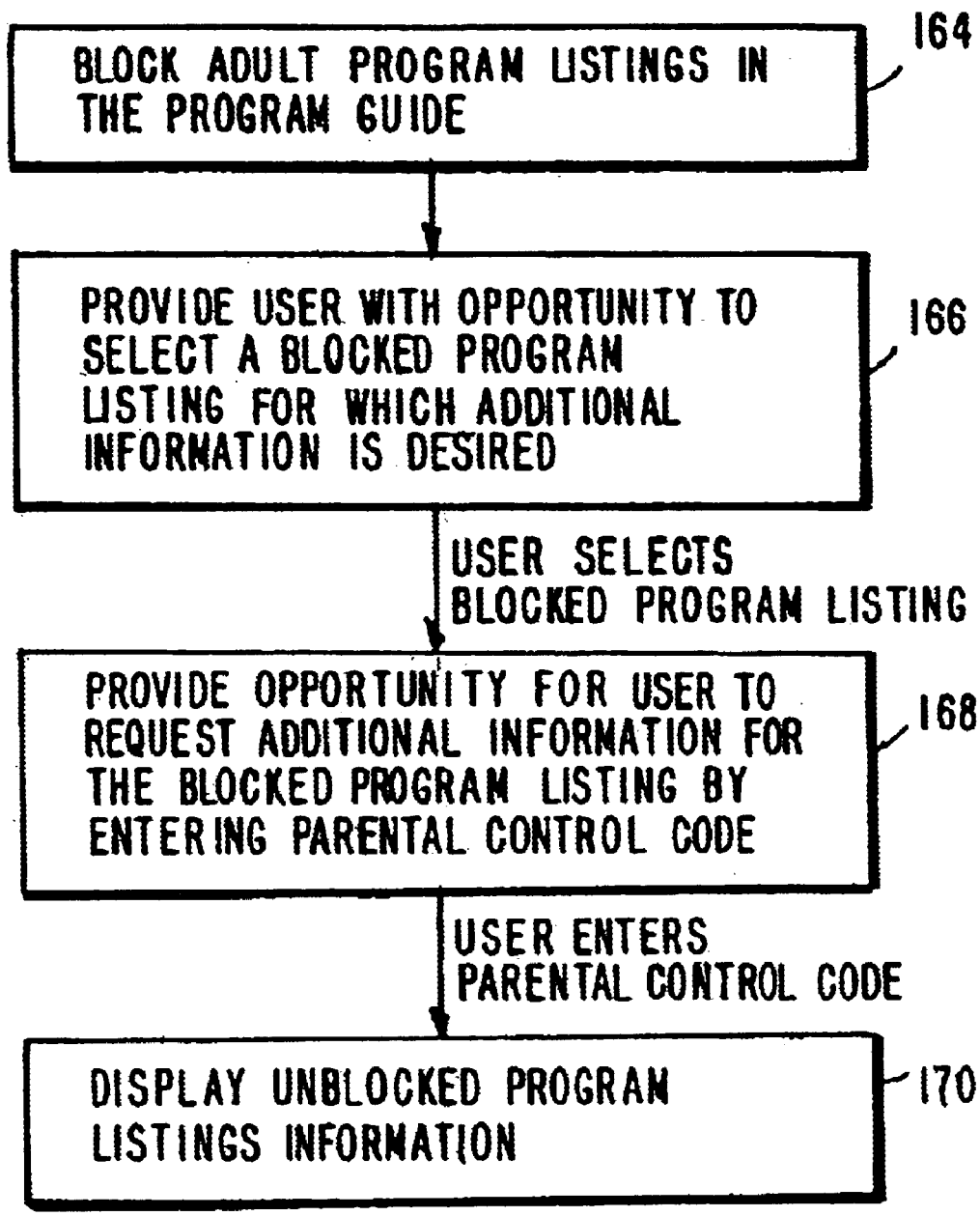
FIG. 13 is a flow chart of steps involved in providing access to blocked program listings information when a user enters a parental control code in accordance with the present invention.

Steps involved in controlling access to adult program listings information are shown in FIG. 13. At step 164, after the user has invoked adult program listings blocking, the program guide blocks adult program listings in the program guide. At step 166, the program guide provides the user with an opportunity to select a blocked program listing for which additional information is desired. If the user selects a particular blocked program listing (e.g., by positioning a highlight region on top of a replacement title), the program guide may provide an opportunity for the user to request additional information for the blocked program listing by entering a parental control code at step 168. After the user has entered the parental control code, the program guide may display the desired unblocked program listings information at step 170.

If the program guide normally provides a screen that is used primarily to list adult programs, the program guide may disable that screen when blocking is invoked. Alternatively, the program guide may allow that screen to be accessed after the user enters a parental control code.

Figure 14:
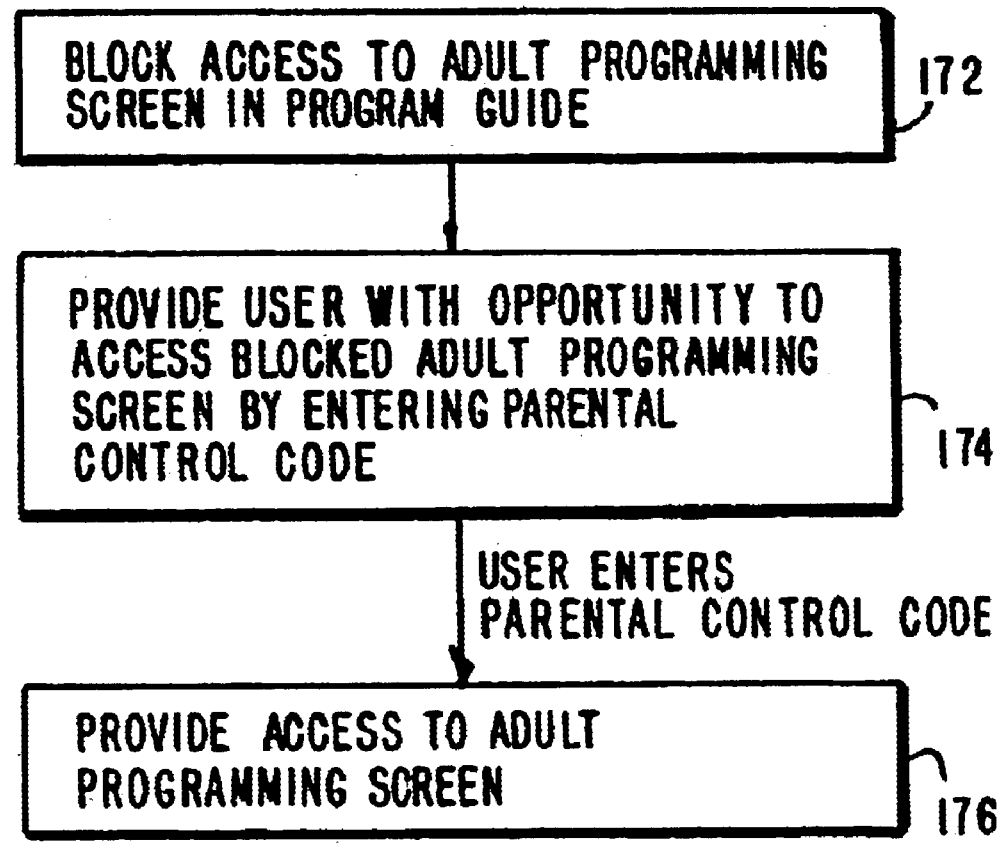
FIG. 14 is a flow chart of steps involved in blocking and unblocking access to a program guide screen that contains primarily adult program listings in accordance with the present invention.

As shown in FIG. 14, if the program guide contains an adult programming screen (i.e., a screen in the program guide primarily used to list adult programs), access to that screen may be blocked at step 172 when adult program listing blocking is invoked by the user. At step 174, the program guide may provide the user with an opportunity to access the blocked adult programming screen by entering a parental control code. If the user enters a valid parental control code, the program guide may provide access to the blocked adult programming screen at step 176.

When the user invokes adult program listings blocking, the program guide may restrict the user's options in the program guide that relate to adult programming. This is illustrated in FIG. 15. At step 178, the program guide provides the user with an opportunity to invoke blocking of adult program listings. If the user invokes program listing blocking, the program guide may block user access to certain program guide functions in connection with adult program listings at step 180. In particular, the program guide may prevent the user from setting automatic program-guide-generated on-screen reminders for adult programs, recording adult programs, including blocked programs listings for adult programs and channels in a favorites profile containing, e.g., a list of favorite programs, etc. Program guides that allow reminders to be set are well known. Program guides that allow users to set reminders and set up preference or favorites profiles are described, for example, in Ellis et al. U.S. patent application Ser. No. 09/034,934, which is hereby incorporated by reference herein in its entirety.

If desired, the program guide may allow users to temporarily disable adult program listings blocking. A parent may, for example, wish to invoke this feature after children have gone to bed for the evening. The program guide may automatically restore adult program listings blocking after an evening of non-use or after the user turns off set-top box 34 (FIG. 1). Steps involved in providing the temporary disablement feature are shown in FIG. 16. At step 182, the program guide provides the user with an opportunity to temporarily disable blocking. For example, the program guide may provide a menu option that allows the user to temporarily disable blocking after entering a parental control code. If the user selects temporary unblocking, at step 184 the program guide temporarily unblocks the program listings for adult programming until, for example, there is no use of the adult program listings for an evening or until the user deactivates part of user-television equipment 32.

A related program guide feature involves temporarily disabling parental controls. This feature operates similarly to the temporary disablement of adult program listings blocking, but involves the temporary disabling of any suitable type of parentally-controlled program guide function and may be used in program guides that do not support adult program listings blocking.

Figure 17:
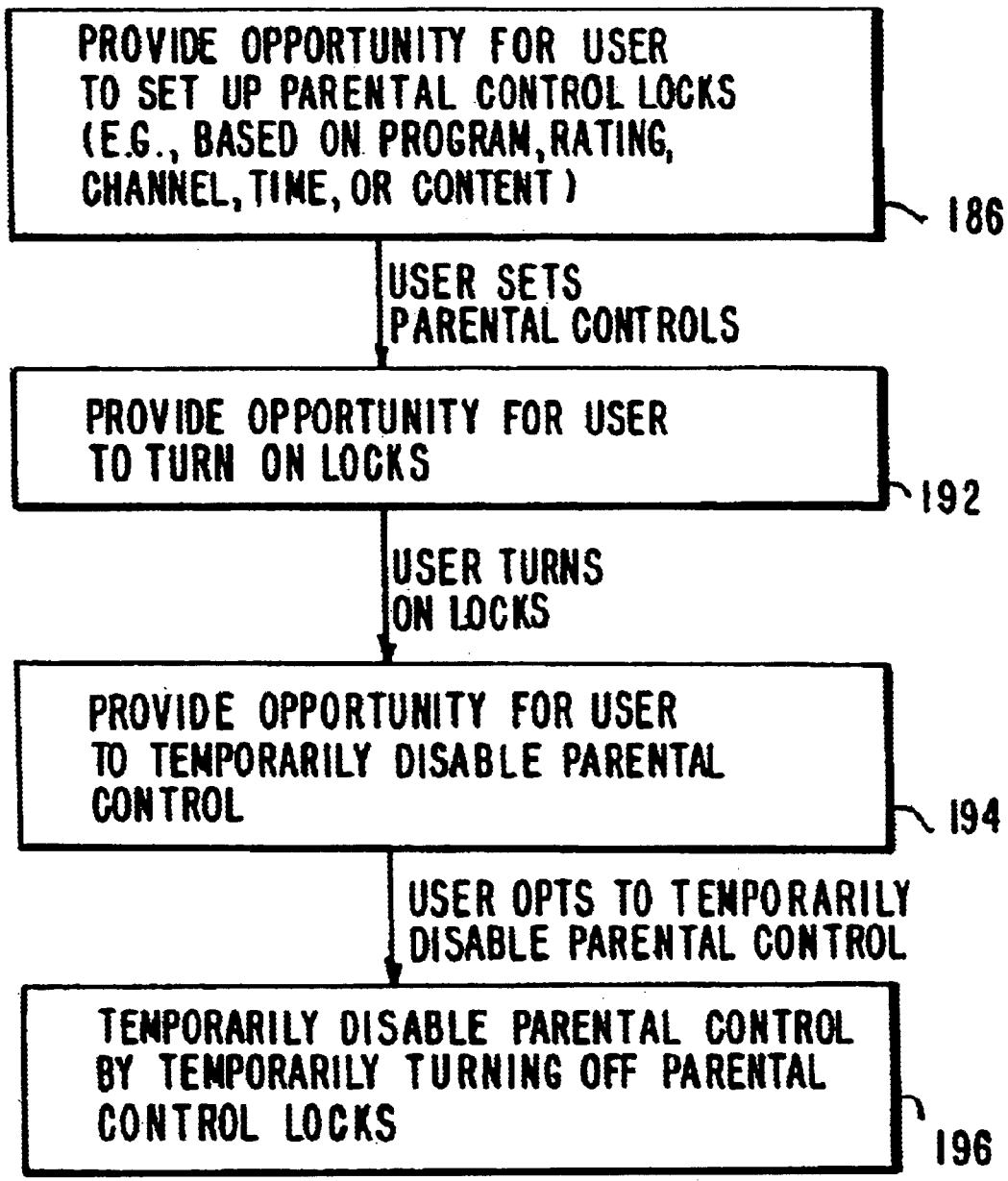
FIG. 17 is a flow chart of steps involved in operating a program guide having parental controls and the capability to temporarily disable those controls in accordance with the present invention.
Figure 18:
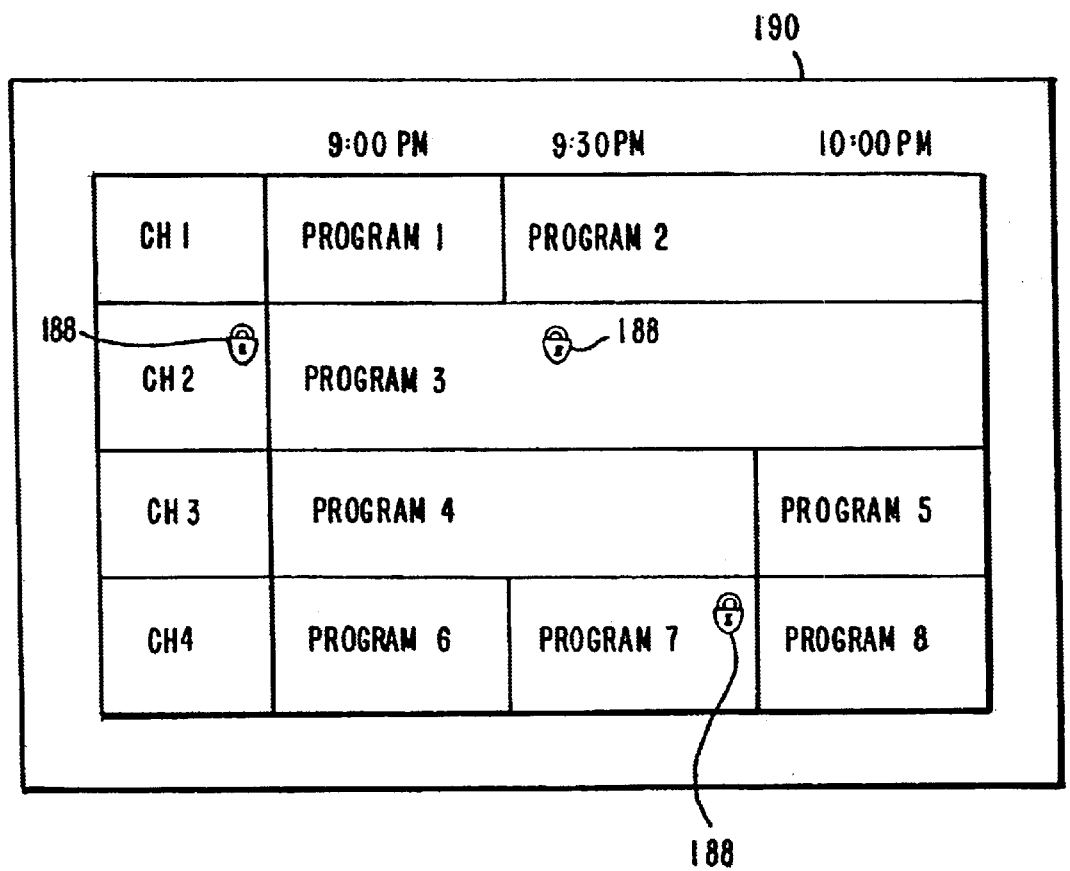
FIG. 18 is an illustrative program guide program listings display screen showing how television program listings may be provided with lock icons to indicate that programming has been parentally controlled in accordance with the present invention.

Steps involved in operating a program guide with this feature are shown in FIG. 17. At step 186, the program guide provides the user with an opportunity to set up various parental controls. For example, the program guide may allow the user to lock selected programs, programs with certain ratings, selected channels, programs that occur at a certain time, or programs that contain potentially objectionable content (e.g., nudity, violence, or strong language). Locked television programming may only be accessed by entering a preestablished parental control code or by passing some other suitable parental access test. As shown in FIG. 18, the program guide may display suitable icons such as lock icons 188 on program listings display screens such as program listings display screen 190 to indicate to the user which programs and channels have been locked. As shown in FIG. 17, after the user has set parental controls, the program guide may provide the user with an opportunity to turn on parental control locks at step 192. If desired, locks may be turned on automatically during parental control set up in step 186. At step 194, after the locks have been turned on, the program guide provides an opportunity for the user to temporarily disable parental control. This may be useful, for example, for allowing a parent to access a full selection of programming after children have gone to bed for the evening, etc. If the user opts to temporarily disable parental control, the program guide temporarily disables parental control by turning off the parental control locks at step 196. Locks may be temporarily disabled using any suitable scheme. For example, locks may be disabled for a predetermined length of time (e.g., several hours) after which they are automatically restored. Locks may also be disabled only until set-top box 34 is unused for an evening or until set-top box 34 is turned off. Locks may also be disabled until the user turns the locks back on with the program guide. Regardless of how the locks are temporarily disabled, parental control of television programming with the same locks that were in place before the temporary disablement may be reestablished when temporary disablement is complete.

The foregoing is merely illustrative of the principles of this invention and various modifications can be made by those skilled in the art without departing from the scope and spirit of the invention.

What is claimed is:

1. An interactive television program guide system in which an interactive television program guide is implemented on user television equipment of a user, comprising:

means for providing program listings to the interactive television program guide, wherein at least some of the program listings contain potentially objectionable material;

means for blocking the potentially objectionable material in the program listings using the interactive television program guide wherein the potentially objectionable material comprises adult program listings;

means for providing an adult programming screen containing adult programming listings; and means for blocking access to the adult programming screen with the interactive television program guide when the potentially objectionable meterial is blocked.

2. The interactive television program guide system defined in claim 1 wherein the system further comprising means for providing access to the blocked adult programming screen with the program guide by providing the user with an opportunity to enter a parental control code.

3. The interactive television program guide system defined in claim 1 wherein the means for blocking further comprises means for replacing the potentially objectionable material in the program listings with unobjectionable material using the interactive television program guide displays the program listings the unobjectionable material is displayed in place of the potentially objectionable material.

4. The interactive television program guide system defined in claim 1 wherein the potentially objectionable material includes adult program titles and wherein the means for blocking further comprises means for replacing the adult program titles in the program listings with unobjectionable material using the interactive television program guide so that when the interactive television program guide displays the program listings the unobjectionable material is displayed in place of the adult program titles.

5. The interactive television program guide system defined in claim 1 wherein the potentially objectionable material includes adult program descriptions and wherein the means for blocking further comprises means for replacing the adult program descriptions in the program listings with unobjectionable material using the interactive television program guide so that when the interactive television program guide displays the program listings the unobjectionable material is displayed in place of the adult program descriptions.

6. The interactive television program guide system defined in claim 1 wherein the potentially objectionable material includes adult program titles and descriptions and wherein the means for blocking further comprises means for replacing the adult program titles and descriptions in the program listings with unobjectionable material using the interactive television program guide so that when the interactive television program guide displays the program listings the unobjectionable material is displayed in place of the adult program titles and descriptions.

7. An interactive television program guide system in which an interactive television program guide if implemented on user television equipment of a user, comprising:

means for providing program listings to the interactive television program guide, wherein at least some of the program listings contain potentially objectionable material;

means for blocking the potentially objectionable meterial in the program listings using the interactive television program guide wherein the potentially objectionable material comprises adult program listings;

means for providing the user with an opportunity to invoke blocking of the adult program listings with the interactive television program guide; and means for blocking user access to the favorite profile feature for adult programs and channels when the user invokes blocking of the adult program listing.

8. The interactive television program guide system defined in claim 7 wherein the means for blocking further comprises means for replacing the potentially objectionable material in the program listings with unobjectionable material using the interactive television program guide so that when the interactive television program guide displays the program listings the unobjectionable material is displayed in place of the potentially objectionable material.

9. The interactive television program guide system defined in claim 7 wherein the potentially objectionable material includes adult program titles and wherein the means for blocking further comprises means for replacing the adult program titles in the program listings with unobjectionable material using the interactive television program guide so that when the interactive television program guide displays the program listings the unobjectionable material is displayed in place of the adult program titles.

10. The interactive television program guide system defined in claim 7 wherein the potentially objectionable material includes adult program descriptions and wherein the means for blocking further comprises means for replacing the adult program descriptions in the program listings with unobjectionable material using the interactive television program guide so that when the interactive television program guide displays the program listings the unobjectionable material is displayed in place of the adult program descriptions.

11. The interactive television program guide system defined in claim 7 wherein the potentially objectionable material includes adult program titles and descriptions and wherein the means for blocking further comprises means for replacing the adult program titles and descriptions in the program listings with unobjectionable material using the interactive television program guide so that when the interactive television program guide displays the program listings the objectionable material is displayed in place of the adult program titles and descriptions.

12. A method for using an interactive television program guide system in which an interactive television program guide is implemented on user television equipment of a user, comprising:

providing program listings to the interactive television program guide, wherein at least some of the program listings contain potentially objectionable material;

blocking the potentially objectionable material in the program listings using the interactive television program guide wherein the potentially objectionable material comprises adult program listings;

providing an adult programming screen containing adult programming listings; and blocking access to the adult programming screen with the interactive television program guide when the potentially objectionable material is blocked.

13. The method defined in claim 12 wherein the method further comprising providing access to the blocked adult programming screen with the program guide by providing the user with an opportunity to enter a parental control code.

14. The method defined in claim 12 wherein blocking further comprises replacing the potentially objectionable material in the program listings with unobjectionable material using the interactive television program guide so that when the interactive television program guide displays the program listings the unobjectionable material is displayed in place of the potentially objectionable material.

15. The method defined in claim 12 wherein the potentially objectionable material includes adult program titles and wherein blocking further comprises replacing the adult program titles in the program listings with unobjectionable material using the interactive television program guide so that when the interactive television program guide displays the program listings the unobjectionable material is displayed in place of the adult program titles.

16. The method defined in claim 12 wherein the potentially objectionable material includes adult program descriptions and wherein blocking further comprises replacing the adult program descriptions in the program listings with unobjectionable material using the interactive television program guide so that when the interactive television program guide displays the program listings the unobjectionable material is displayed in place of the adult program descriptions.

17. The method defined in claim 12 wherein the potentially objectionable material includes adult program titles and descriptions and wherein blocking further comprises replacing the adult program titles and descriptions in the program listings with unobjectionable material using the interactive television program guide so that when the interactive television program guide displays the program listings the unobjectionable material is displayed in place of the adult program titles and descriptions.

18. A method for using an interactive television program guide system in which an interactive television program guide is implemented on user television equipment of a user, comprising:

providing program listings to the interactive television program guide, wherein at least some of the program listings contain potentially objectionable material;

blocking the potentially objectionable material in the program listings using the interactive television program wherein the interactive television program guide has a favorite program profile feature and wherein the potentially objectionable material comprises adult program listings;

providing the user with an opportunity to invoke blocking of the adult program listings with the interactive television program guide; and blocking user access to the favorites profile feature for adult programs and channels when the user invokes blocking of the adult program listings.

19. The method defined in claim 18 wherein blocking further comprises replacing the potentially objectionable material in the program listings with unobjectionable material using the interactive television program guide so that when the interactive television program guide displays the program listings the unobjectionable material is displayed in place of the potentially objectionable material.

20. The method defined in claim 18 wherein the potentially objectionable material includes adult program titles and wherein blocking further comprises replacing the adult program titles in the program listings with unobjectionable material using the interactive television program guide so that when the interactive television program guide displays the program listings the unobjectionable material is displayed in place of the adult program titles.

21. The method defined in claim 18 wherein the potentially objectionable material includes adult program descriptions and wherein blocking further comprises replacing the adult program descriptions in the program listings with unobjectionable material using the interactive television program guide so that when the interactive television program guide displays the program listings the unobjectionable material is displayed in place of the adult program descriptions.

22. The method defined in claim 18 wherein the potentially objectionable material includes adult program titles and descriptions and wherein the blocking further comprises replacing the adult program titles and descriptions in the program listings with unobjectionable material using the interactive television program guide so that when the interactive television program guide displays the program listings the unobjectionable material is displayed in place of the adult program titles and descriptions.

23. Machine-readable media for using an interactive television program guide system in which an interactive television program guide is implemented on user television equipment of a user, the user television equipment comprising an audio output and a video output, wherein the media is encoded with machine-readable instruction for performing the method comprising:
provide program listings to the interactive television program guide, wherein at least some of the program listings contain potentially objectionable material;
blocking the potentially objectionable material in the program listings using the interactive television program guide wherein the potentially objectionable material comprises adult program listings;
providing an adult programming screen containing adult programming listings; and
blocking access to the adult programming screen with the interactive television program guide when the potentially objectionable material is blocked.

24. The machine-readable media defined in claim 23 wherein the method further comprising providing access to the blocked adult programming screen with the program guide by providing the user with an opportunity to enter a parental control code.

25. The machine-readable media defined in claim 23 wherein the method further comprises replacing the potentially objectionable material in the program listings with unobjectionable material using the interactive television program guide so that when the interactive television program guide displays the program listings the unobjectionable material is displayed in place of the potentially objectionable material.

26. The machine-readable media defined in claim 23 wherein the potentially objectionable material includes adult program titles and the method further comprises replacing the adult program titles in the program listings with unobjectionable material using the interactive television program guide so that when the interactive television program guide displays the program listings the unobjectionable material is displayed in place of the adult program titles.

27. The machine-readable media defined in claim 23 wherein the potentially objectionable material includes adult program descriptions and wherein the method further comprises replacing the adult program descriptions in the program listings with unobjectionable material using the interactive television program guide so that when the interactive television program guide displays the program listings the unobjectionable material is displayed in place of the adult program descriptions.

28. The machine-readable media defined in claim 23 wherein the potentially objectionable material includes adult program titles and descriptions and wherein the method further comprises replacing the adult program titles and descriptions in the program listings with unobjectionable material using the interactive television program guide so that when the interactive television program guide displays the program listings the unobjectionable material is displayed in place of the adult program titles and descriptions.

29. Machine-readable media for using an interactive television program guide system in which an interactive television program guide is implemented on user television equipment of a user, the user television equipment comprising an audio output and a video output, wherein the media is encoded with machine-readable instruction for performing the method comprising:
providing program listings to the interactive television program guide, wherein at least some of the program listings contain potentially objectionable material;
blocking the potentially objectionable material in the program listings using the interactive television program guide wherein the interactive television program guide has a favorite program profile feature and wherein the potentially objectionable material comprises adult program listings;
providing the user with an opportunity to invoke blocking on the adult program listings with the interactive television program guide; and
blocking user access to the favorites profile feature for adult programs and channels when the user invokes blocking of the adult program listings.

30. The machine-readable media defined in claim 29 wherein the method further comprises replacing the potentially objectionable material in the program listings with unobjectionable material using the interactive television program guide so that when the interactive television program guide displays the program listings the unobjectionable material is displayed in place of the potentially objectionable material.

31. The machine-readable media defined in claim 29 wherein the potentially objectionable material includes adult program titles and wherein the method further comprises replacing the adult program titles in the program listings with unobjectionable material using the interactive television program guide so that when the interactive television program guide displays the program listings the unobjectionable material is displayed in place of the adult program titles.

32. The machine-readable media defined in claim 29 wherein the potentially objectionable material includes adult program descriptions and wherein the method further comprises replacing the adult program descriptions in the program listings with unobjectionable material using the interactive television program guide so that when the interactive television program guide displays the program listings the unobjectionable material is displayed in place of the adult program descriptions.

33. The machine-readable media defined in claim 29 wherein the potentially objectionable material includes adult program titles and descriptions and wherein the method further comprises replacing the adult program titles and descriptions in the program listings with unobjectionable material using the interactive television program guide so the when the interactive television program guide displays the program listings the unobjectionable material is displayed in place of the adult program titles and descriptions.

34. An interactive television program guide system in which an interactive television program guide is implemented on user television equipment of a user, comprising:
a user input device;
a user output device comprising a display device and speakers; and
processing circuitry configured to:
provide program listings to the interactive television program guide wherein at least some of the program listings contain potentially objectionable material;

block the potentially objectionable material in the program listings using the interactive television program guide wherein the potentially objectionable material comprises adult program listings;

provide an adult programming screen containing adult programming listings; and block access to the adult programming screen with the interactive television program guide when the potentially objectionable material is blocked.

35. The interactive television program guide system defined in claim 34 wherein the processing circuitry is further configured to provide access to the blocked adult programming screen with the program guide by providing the user with an opportunity to enter a parental control code.

36. The interactive television program guide system defined in claim 34 wherein the processing circuitry is further configured to replace the potentially objectionable material in the program listings with unobjectionable material using the interactive television program guide so that when the interactive television program guide displays the program listings the unobjectionable material is displayed in place of the potentially objectionable material.

37. The interactive television program guide system defined in claim 34 wherein the potentially objectionable material includes adult program titles and the processing circuitry is further configured to replace the adult program titles in the program listings with unobjectionable material using the interactive television program guide so that when the interactive television program guide displays the program listings the unobjectionable material is displayed in place of the adult program titles.

38. The interactive television program guide system defined in claim 34 wherein the potentially objectionable material includes adult program descriptions and wherein the processing circuitry is further configured to replace the adult program descriptions in the program listings with unobjectionable material using the interactive television program guide so that when the interactive television program guide displays the program listings the unobjectionable material is displayed in place of the adult program descriptions.

39. The interactive television program guide system defined in claim 34 wherein the potentially objectionable material includes adult program titles and descriptions and wherein the processing circuitry is further configured to replace the adult program titles and descriptions in the program listings with unobjectionable material using the interactive television program guide so that when the interactive television program guide displays the program listings the objectionable material is displayed in place of the adult program titles and description.

\* \* \* \* \*